UNITED STATES PATENT OFFICE.

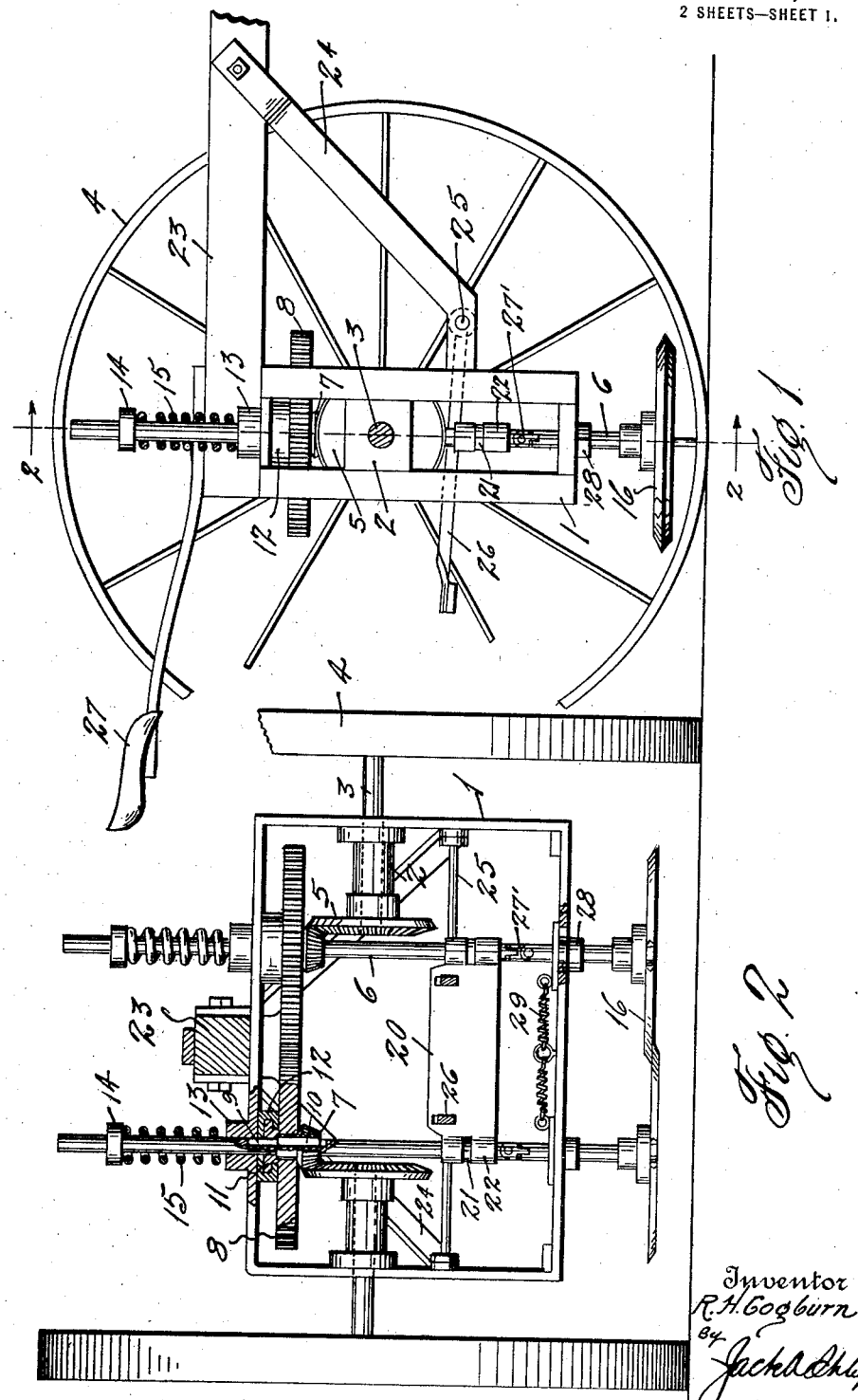

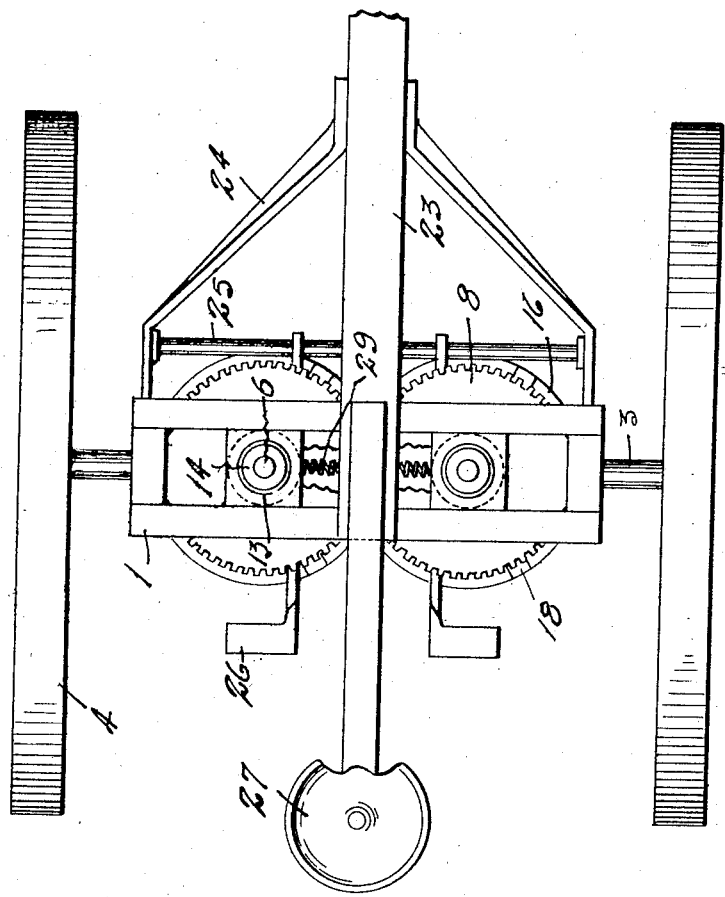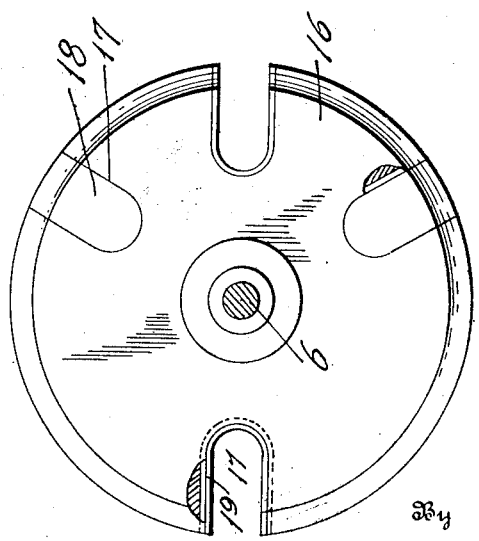

ROBERT H. COGBURN, OF McKINNEY, TEXAS.

COTTON-CHOPPER.

1,349,266.	Specification of Letters Patent.	Patented Aug. 10, 1920.

Application filed February 28, 1919. Serial No. 279,808.

*To all whom it may concern:*

Be it known that I, ROBERT H. COGBURN, citizen of the United States, residing at McKinney, in the county of Collin and State of Texas, have invented certain new and useful Improvements in Cotton-Choppers, of which the following is a specification.

This invention relates to new and useful improvements in cotton choppers.

The invention contemplates a pair of horizontal disks having co-acting shearing edges with registering gaps for receiving the stalk of the plant and thus leaving a regular "stand." Means is to be provided for varying the number of gaps and thus controlling the spaces between stalks left standing. Vertically adjustable and laterally yieldable shafts carry the cutters so that their application to the work is under control of the operator and the cutters will also yield laterally when an obstruction comes therebetween. One of the features is an insert for the gaps which may be used to reduce the size or completely fill the gap.

The invention will be more readily understood from a reading of the following specification and by reference to the accompanying drawings, in which an example of the invention is shown and wherein:

Figure 1 is a side elevation of the chopper,

Fig. 2 is a front elevation,

Fig. 3 is a plan view, and

Figs. 4 and 5 are details of the cutters and their inserts.

In the drawings the numeral 1 designates a vertical rectangular frame disposed transversely of the chopper and provided with inwardly extending journal boxes 2 at each side. Axles 3 are mounted in boxes and held against longitudinal displacement. The outer ends of the axles extend from the frame and are mounted in ground wheels 4 which impart rotation to the axles when the chopper is driven forward. Bevel gears 5 are fastened on the inner ends of the axles with their hubs engaging the ends of the boxes.

Vertical shafts 6 are disposed in the frame on each side of the center and are slidable through bevel pinions 7 and horizontal spur gears 8, the latter meshing. Each shaft has a keyway 9 receiving a key 10 carried by the pinion and gear thereof. The pinions are fastened in the gears and each gear has a flanged boss 11 on its upper side rotatably suspended in a hanger 12 secured to the underside of the top of the frame. Each shaft passes through a boss 13 on the top of the frame and has a collar 14 secured to its upper end and resting on a coiled spring 15 which surrounds the shaft and is supported on the boss. The shafts are sustained by the springs.

Cutter disks 16 are fastened on the lower ends of the shafts and overlap at the center of the chopper. Each disk has a plurality of gaps 17. When it is not desired to use a gap it is filled by sliding a plug 18 thereinto. To reduce the size of a gap a U-shaped insert 19 may be slid thereinto. The edges of the plugs and inserts are beveled and the edges of the gaps are shaped to snugly receive the same, so that the plugs and inserts are held in by frictional contact. The disks are ordinarily used with opposed gaps either open or reduced by inserts; while the other gaps are filled with plugs. The disks are set so that the gaps of one register with those of the other where the disks overlap. By this arrangement two plants are left standing to each revolution of the disks, but when it is desired to leave the plants closer together one of the inserts is withdrawn and a plug substituted and the plugs withdrawn from the other gaps and inserts placed therein so as to give three gaps to each disk.

A bridle member 20 is disposed between the shafts and has sleeves 22 at each end surrounding the shafts and receiving collars 21 rotatably confined on the shaft. A central beam 23 is fastened on top of the frame and supported by a pair of angular braces 24 extending from the frame 1. The braces support a horizontal rock shaft 25 in front of the frame and foot levers 26 pivoted on the shaft extend through the bridle member and terminate in rear of the frame. A seat 27 is supported in rear of the frame.

The springs 15 normally support the disks above the ground and the driver by depressing the foot levers 26 may force the disks down into cutting position. It is obvious that by relieving the pressure on the levers the springs will immediately raise the disks, thus clearing any obstruction. Just below the sleeve 22 the shafts include universal joints 27' and below these joints the shafts pass through boxes 28 mounted to slide outwardly in the bottom of the frame and normally held into position by coiled springs 29. This arrangement permits the disks to spread apart in case an obstruction is received therebetween, thus saving the cutting edges from injury.

In using the machine it is drawn through the field with the ground wheels 4 in the furrows on each side of a row so that the plants are cut by the overlapping edges of the disks except when the gaps meet, at which instances the plants are left standing. The wheels 4 revolve the axles 3 which revolve the pinions 5 and rotate the gears 8 by means of the pinions 7. The pinions 7 and gears 8 rotate the shafts 6 by means of the keys 10 which engage in the key ways 9. The key ways are long enough to permit the shafts to slide vertically and the bridle member is carried up and down by said shafts.

What I claim is:

1. In a cotton chopper, a frame, axles supporting the frame, ground wheels mounted on the axles, vertical shafts slidable in the frame, coiled springs supporting the shafts, means for depressing the shafts against the tension of the springs, and means for imparting rotation to the shafts.

2. In a cotton chopper, a vertical frame, axles mounted in each side of the frame, ground wheels fastened on the axles, beveled gears fastened on the axles within the frame, vertical shafts slidable within the frame, gears surrounding the shafts, pinions attached to the gears and surrounding the shafts, connections between the pinions and the shafts for imparting rotation to the latter, springs surrounding the shafts and supporting the same on the frame, a bridle connecting the shafts, means for depressing the bridle for depressing the shafts, and overlapping cutter disks mounted on the lower ends of the shafts and provided with gaps.

3. In a cotton chopper, a frame, axles supporting the frame, ground wheels mounted on the axles, vertical shafts slidable in the frame, means for imparting rotation to the shafts, coiled springs supporting the shafts, means for depressing the shafts against the tension of the springs, cutting disks on the lower ends of the shafts, and a second coiled spring connecting the shafts, the shafts being jointed above the points of connection with the second coiled spring.

4. In a cotton chopper, a vertical frame, axles entering the frame, ground wheels supporting the axles, beveled gears fastened on the inner ends of the axles, vertical shafts longitudinally adjustable in the frame, coiled springs resting on the frame and supporting the shafts at their upper ends, gears suspended in the frame and through which the shafts slide, driving pinions surrounding the shafts and meshing with the bevel gears, driving connections between the shafts, the suspended gears and the pinions, a bridle connecting the shafts, foot levers pivoted to the frame and engaging the bridle, and overlapping cutting disks on the lower ends of the shafts.

In testimony whereof I affix my signature.

ROBERT H. COGBURN.